(12) United States Patent
Keaton et al.

(10) Patent No.: US 11,751,079 B2
(45) Date of Patent: *Sep. 5, 2023

(54) TRANSMISSION SPEED TESTING OF A WIRELESS LOCAL NETWORK

(71) Applicant: CenturyLink Intellectual Property LLC, Broomfield, CO (US)

(72) Inventors: William J. Keaton, Yardley, PA (US); Brian E. Bond, Fairmont, WV (US); David J. Moore, Lakewood Ranch, FL (US)

(73) Assignee: CenturyLink Intellectual Property LLC, Broomfield, CO (US)

( * ) Notice: Subject to any disclaimer, the term of this patent is extended or adjusted under 35 U.S.C. 154(b) by 32 days.

This patent is subject to a terminal disclaimer.

(21) Appl. No.: 17/561,879

(22) Filed: Dec. 24, 2021

(65) Prior Publication Data

US 2022/0132345 A1 Apr. 28, 2022

Related U.S. Application Data

(63) Continuation of application No. 16/817,075, filed on Mar. 12, 2020, now Pat. No. 11,223,966.

(60) Provisional application No. 62/869,934, filed on Jul. 2, 2019.

(51) Int. Cl.
*H04W 24/08* (2009.01)
*H04W 84/12* (2009.01)

(52) U.S. Cl.
CPC ............ *H04W 24/08* (2013.01); *H04W 84/12* (2013.01)

(58) Field of Classification Search
None
See application file for complete search history.

(56) References Cited

U.S. PATENT DOCUMENTS

| | | |
|---|---|---|
| 2013/0272146 A1 | 10/2013 | Jones |
| 2017/0214585 A1 | 7/2017 | Whiteneck |
| 2021/0006992 A1 | 1/2021 | Keaton |

*Primary Examiner* — Chi H Pham
*Assistant Examiner* — Raul Rivas

(57) ABSTRACT

A wireless testing system is provided that testing transmission speeds associated with a WLAN or other wireless network. In one instance, a network transmission between a device in a telecommunications network and a modem be measured and initiated via an application executed on a mobile device. One or more Wi-Fi speed tests may also be performed to determine a transmission speed between a wireless device associated with the premises and the modem of the WLAN. To conduct the Wi-Fi speed test, a mobile device (such as the mobile device executing the application) may transmit, in some instances in response to an input to the mobile device, an instruction to the test controller to conduct the Wi-Fi speed test. The measured transmission speeds may be controlled by a controller that may store the speed test results in a network repository available to the mobile device.

18 Claims, 10 Drawing Sheets

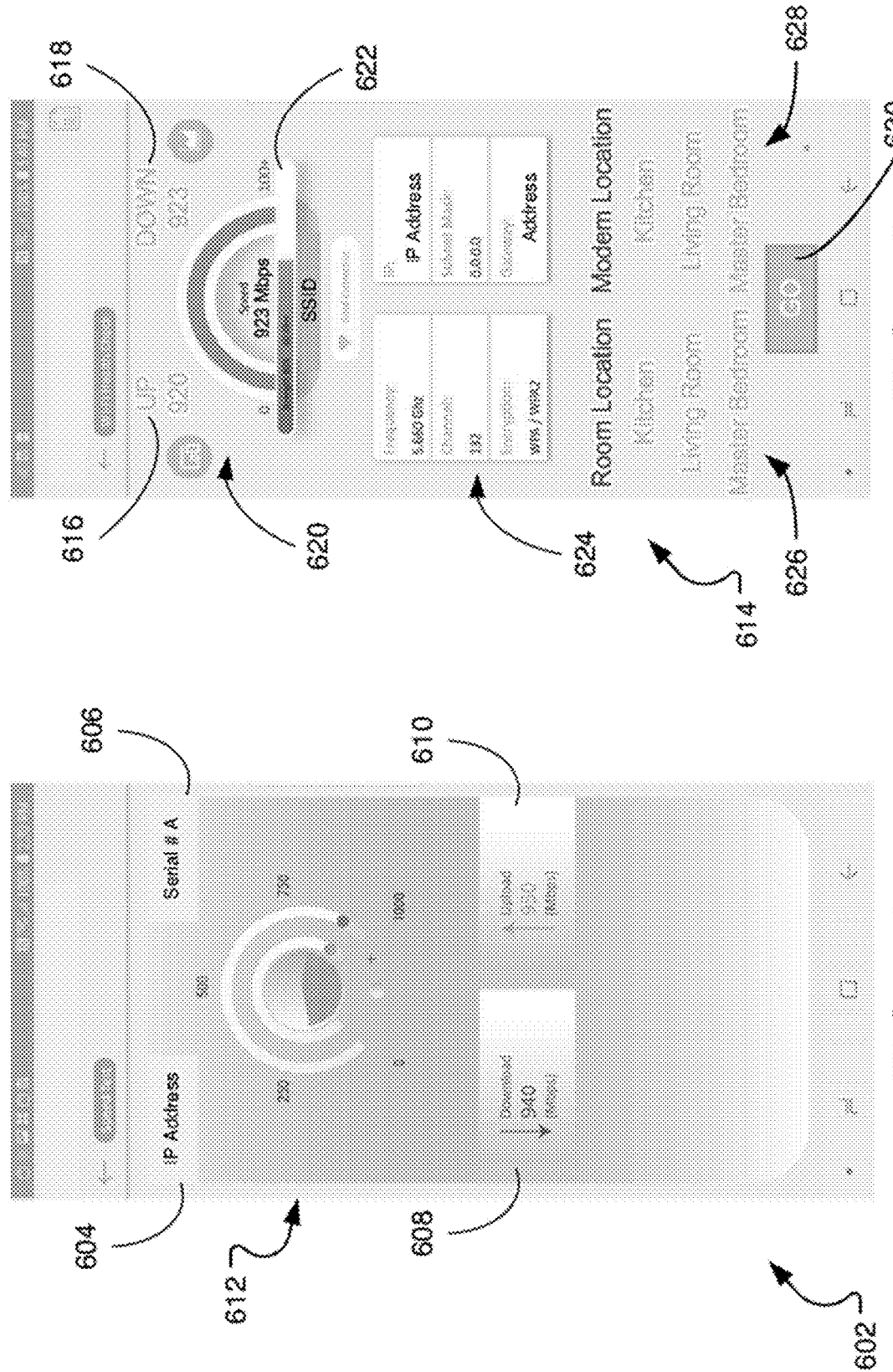

TRANSMISSION SPEED TESTING OF A WIRELESS LOCAL NETWORK

TECHNICAL FIELD

Embodiments of the present invention generally relate to systems and methods for implementing a telecommunications or data network, and more specifically for testing transmission speeds of devices or components of a local wireless network.

BACKGROUND

Telecommunication networks provide for the transmission of information across some distance through terrestrial, wireless or satellite communication networks. Such communications may involve voice, data or multimedia information, among others. In some instances, the telecommunications network may provide Internet access to one or more customers of the network through a wired or wireless interface. For example, the network may provide the customer with a modem that connects to or otherwise provides access to the Internet. The modem may be located at a customer premises, such as a customer's home and place of business. Via the modem, a number of computing devices may access and interact with the Internet to share data with other computing devices. In one particular example, one or more wireless devices may communicate with the modem through a Wi-Fi connection. In general, Wi-Fi is a wireless communication standard that allows for the generation of wireless local area network (WLAN) of devices. A typical WLAN set-up includes a modem that broadcasts a wireless signal to multiple wireless devices and acts as a gateway device to a larger network over which connection to the Internet is available.

It is often useful to obtain an accurate measurement of transmission speeds associated with a WLAN of a customer premises. For example, a telecommunications or other networking company may contract with the customer through a service level agreement (SLA) to provide access to one or more network services via a modem or other wireless. Some SLAs may include a base or floor transmission rate between components of the WLAN, such as a base transmission rate from the network to the modem and/or a base transmission rate from the modem to a wireless device associated with the customer premises. This information may aid customers and/or network technicians in understanding network and WLAN performance, troubleshooting transmission issues to improve the WLAN performance, and ensuring compliance with SLAs associated with providing the WLAN and network access to the customer.

It is with these observations in mind, among other, that aspects of the present disclosure were conceived.

SUMMARY

One aspect of the present disclosure relates to a system for testing a network performance. The system may include a testing device in communication with a wireless broadcasting device, the testing device receiving network test communications from a testing server of a telecommunications network via the wireless broadcasting device and a testing controller transmitting one or more instructions to the testing device and the testing server to cause the testing device to communicate with the testing server and measure an associated transmission speed of the network test communications. The system may also include a mobile device transmitting one or more test initiation commands to the testing controller to initiate a transmission speed test of the testing device, the mobile device further receiving the associated network transmission speed of the test communications for display on a display device associated with the mobile device.

Another aspect of the present disclosure relates to a wireless network device comprising one or more processors, a wireless transmitter/receiver in communication with the one or more processors, and a memory comprising instructions. The instructions, when executed by the one or more processors, may perform the operations of obtaining a network transmission speed measurement of one or more network test communications between a testing device and a testing server of a network, wherein the testing device transmits, to the testing server, the one or more network test communications via a wireless broadcasting device in communication with the testing server of the network and obtaining a wireless transmission speed measurement of one or more wireless test communications transmitted between the testing device and a wireless test client application executed on a mobile device, wherein the testing device transmits, to the mobile device, the one or more wireless test communications via the wireless broadcasting device. The instructions may also perform the operation of displaying, on a display device and via a user interface, the network transmission speed measurement of the one or more network test communications and the wireless transmission speed measurement of the one or more wireless test communications.

Yet another aspect of the present disclosure relates to a method for network testing, the method including registering a testing device associated in communication with a wireless broadcasting device and initiating a network speed test to determine a transmission speed of one or more network test communications between the testing device and a testing server of a network, wherein the testing device transmits the one or more network test communications via the wireless broadcasting device. The method may also include connecting, via the wireless transmitter/receiver, to a wireless network signal broadcast by the wireless broadcasting device, executing a wireless test client application to communicate with the testing device to receive one or more wireless test communications, and initiating a wireless speed test to determine a transmission speed of one or more wireless test communications between the testing device and a wireless test client application, wherein the testing device transmits the one or more wireless test communications via the wireless broadcasting device.

BRIEF DESCRIPTION OF THE DRAWINGS

FIG. 6A illustrates an example user interface displaying network speed test results of a wireless network in accordance with one embodiment.

FIG. 6B illustrates an example user interface for initiating a Wi-Fi speed test of a wireless network from an application executed on a mobile device in accordance with one embodiment.

DETAILED DESCRIPTION

Figure 1:
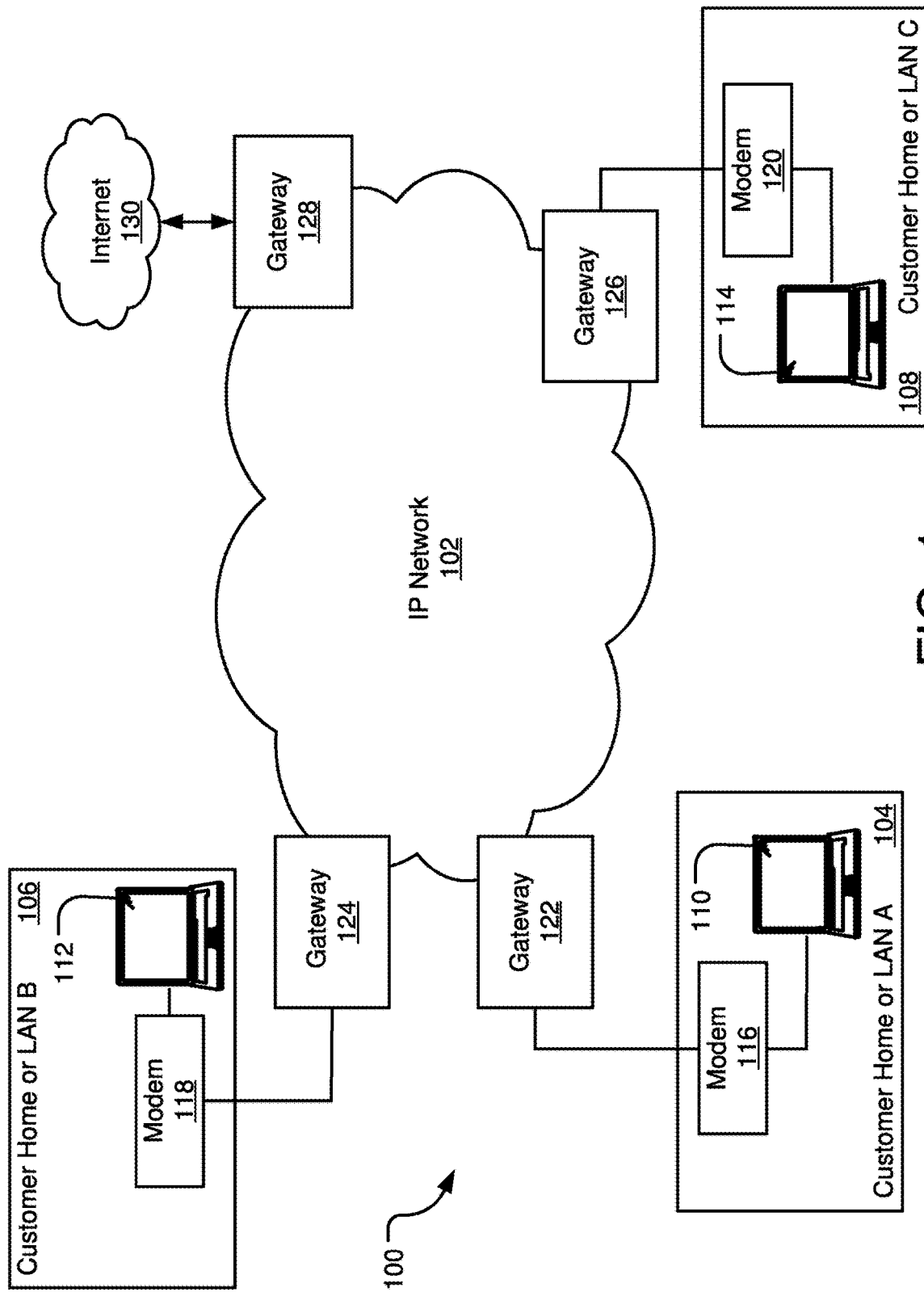
FIG. 1 is a schematic diagram illustrating an exemplary Internet Protocol (IP) operating environment in accordance with one embodiment.

Aspects of the present disclosure involve systems, methods, and the like, for testing transmission speeds associated with a WLAN or other wireless network at a customer premises. In one instance, a network transmission between a device in a telecommunications network and a modem or other gateway device to the network may be measured. The measurement may be initiated via an application executed on a mobile device operated by a technician located at the premises or remotely via an application executed on a computing device operated by a network technician. A testing device may be connected to or otherwise in communication with the modem at the customer premises and registers, when connected, with a test controller application or program. The test controller may receive an indication to begin the network speed test from the application of the mobile device and instruct the testing device to connect to a speed test server of the network. The speed test server may be an application server configured to transmit test packets to the testing device and receive test packets from the testing device. The test controller may derive or receive the transmission of such packets between the speed test server and the testing device. For example, the controller may monitor the transmissions between the speed test server and the testing device at the premises to determine the transmission rate between the devices. In another example, another component of the network, such as the testing device and/or the speed test server, may provide speed test results to the controller. The controller may, upon receiving or deriving the results, may associate the results with the premises, store the results in a network repository, and/or provide the results to the application of the mobile device. The speed test results may be utilized to configure or alter the WLAN at the premises or to provide a snapshot of the performance of the WLAN for current or future reference when servicing the WLAN.

One or more Wi-Fi speed tests may also be performed to determine a transmission speed between a wireless device associated with the premises and the modem of the WLAN. To conduct the Wi-Fi speed test, a mobile device (such as the mobile device executing the application) may wirelessly pair with the modem of the customer premises. The application may transmit, in some instances in response to an input to the mobile device, an instruction to the test controller to conduct the Wi-Fi speed test. The controller may, in turn, configure the testing device to transmit test packets to the mobile device, similar to the network speed test described above between the speed test server of the network and the testing device. The measured transmission speeds to the mobile device may again be provided to or derived by the controller. The controller may store the Wi-Fi speed test results in a network repository and/or provide the Wi-Fi speed test results to the mobile device.

In addition, the application may include a user interface that provides various controls over the network and Wi-Fi speed testing and displays the results. The user interface may also provide some indicators of the speed testing compared to one or more threshold values. For example, information from an SLA between a network administrator and the customer may be input into or otherwise available by the application. The application may then establish one or more speed test thresholds based on the information and, when displaying the speed test results on the display of the mobile device, may provide some indication of the results in comparison to the generated threshold values. In one particular instance, speed test results that are less than the corresponding threshold value may be indicated in red to indicate to a network administrator, technician, or the customer. The WLAN, or any other portion of the network, may be reconfigured in response to the provided speed test results to improve the results to be above the threshold values.

FIG. 1 schematic diagram illustrating an exemplary Internet Protocol (IP) operating environment in accordance with one embodiment. In general, the environment 100 provides for establishing communication sessions between network users and the Internet 130. In particular, one or more customer networks 104-108 may connect to an IP network 102 to provide and receive communications with the Internet 130. With specific reference to FIG. 1, the environment 100 includes an IP network 102, which may be provided by a wholesale network service provider. In general, the network 102 of FIG. 1 may include any communication network devices known or hereafter developed.

The IP network 102 includes numerous components such as, but not limited to gateways, routers, route reflectors, and registrars, which enable communication and/or provides services across the IP network 102, but are not shown or described in detail here because those skilled in the art will readily understand these components. Communications between the IP network 102 and other entities or networks, such as the one or more customer home or business local area networks (LANs) 104-108, may also be managed through network environment 100.

Customer networks 104-108 can include communication devices such as, but not limited to, a personal computer, wireless communication device, gaming console, etc., connected to a modem 116-120. Although shown in FIG. 1 as computer 110, the communication devices may include any type of communication device that receives a multimedia signal, such as an audio, video or web-based signal, and utilizes that signal for operation of the communication device. In many cases, the computing device 110 may be a wireless computing device. The communication and networking components of the customer networks 104-108 enable a user at the customer network to communicate via the IP network 102 to other communication devices or the Internet 130. Components of the customer networks 104-108 are typically home- or business-based, but they can be relocated and may be designed for easy portability.

The customer networks 104-108 typically connects to the IP network 102 via respective gateways 122-126 or other network edge devices. In some instances, many such customer networks 104-108 may connect at a single gateway 122-126 such that a gateway may provide an interface to the IP network 102 for several such networks 104-108. The IP network 102 may also connect to other networks (collectively known herein as the "Internet" 130) through another gateway 128 or other edge device. In this manner, the IP network 102 may connect customer networks 104-108 to the Internet 130 or other devices/networks associated with the IP network 102.

Figure 2:
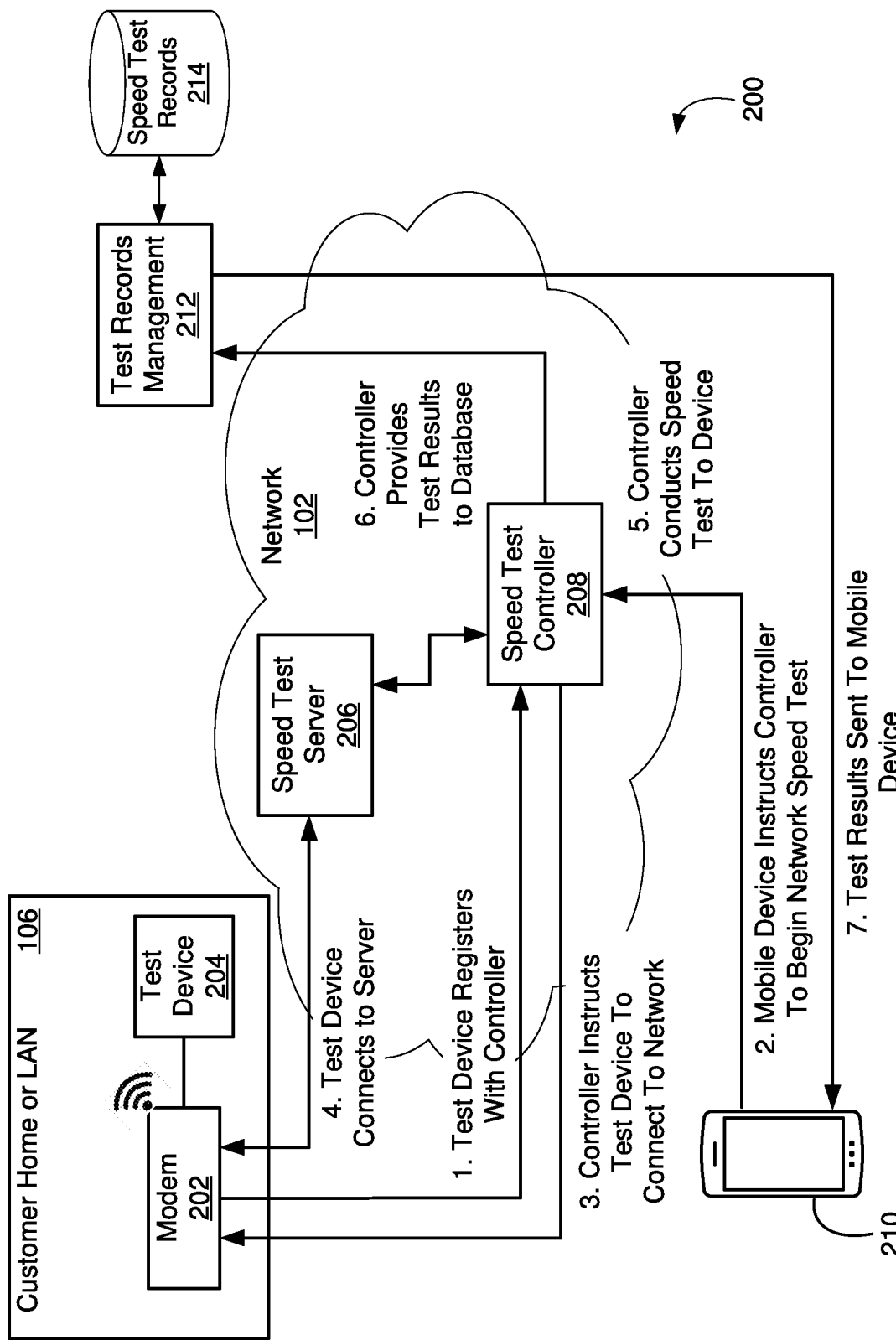
FIG. 2 is a schematic diagram illustrating a network environment and method for conducting a network speed test between a telecommunications network and a modem of a customer network in accordance with one embodiment.

In many instances, measurement of transmission speeds associated with a customer network 106 of a customer premises may aid the network 102 in tailoring or providing services to the connected customer network 106. FIG. 2 is a schematic diagram illustrating a network environment 200 and method for conducting a network speed test between a telecommunications network 102 and a modem 202 of a customer network 106. Some of the components of the network environment 200 may be similar to those components discussed above, such as network 102 and customer home network 106. In one particular instance, the customer network 106 may include a wireless local area network (WLAN) comprising one or more wireless devices communicating with the network 102 via a modem 202. Also similar to above, the customer network 106 may connect to or otherwise communicate with network 102 via an edge device or gateway (not shown). The interactions of the components of the network environment 200 are discussed in more detail below.

The components of the network environment 200 may communicate via known or hereafter developed networking infrastructures or methods. For example, mobile device 210 may wirelessly connect to modem 202 of the customer network 106 through a Wi-Fi connection. The mobile device 210 may also communicate with components of the network 102, such as speed test controller 208 and test records management 212 via a cellular communication network, which may or may not include network 102. Other components of the network environment 200 may also communicate with other components in a similar manner.

Figure 3:
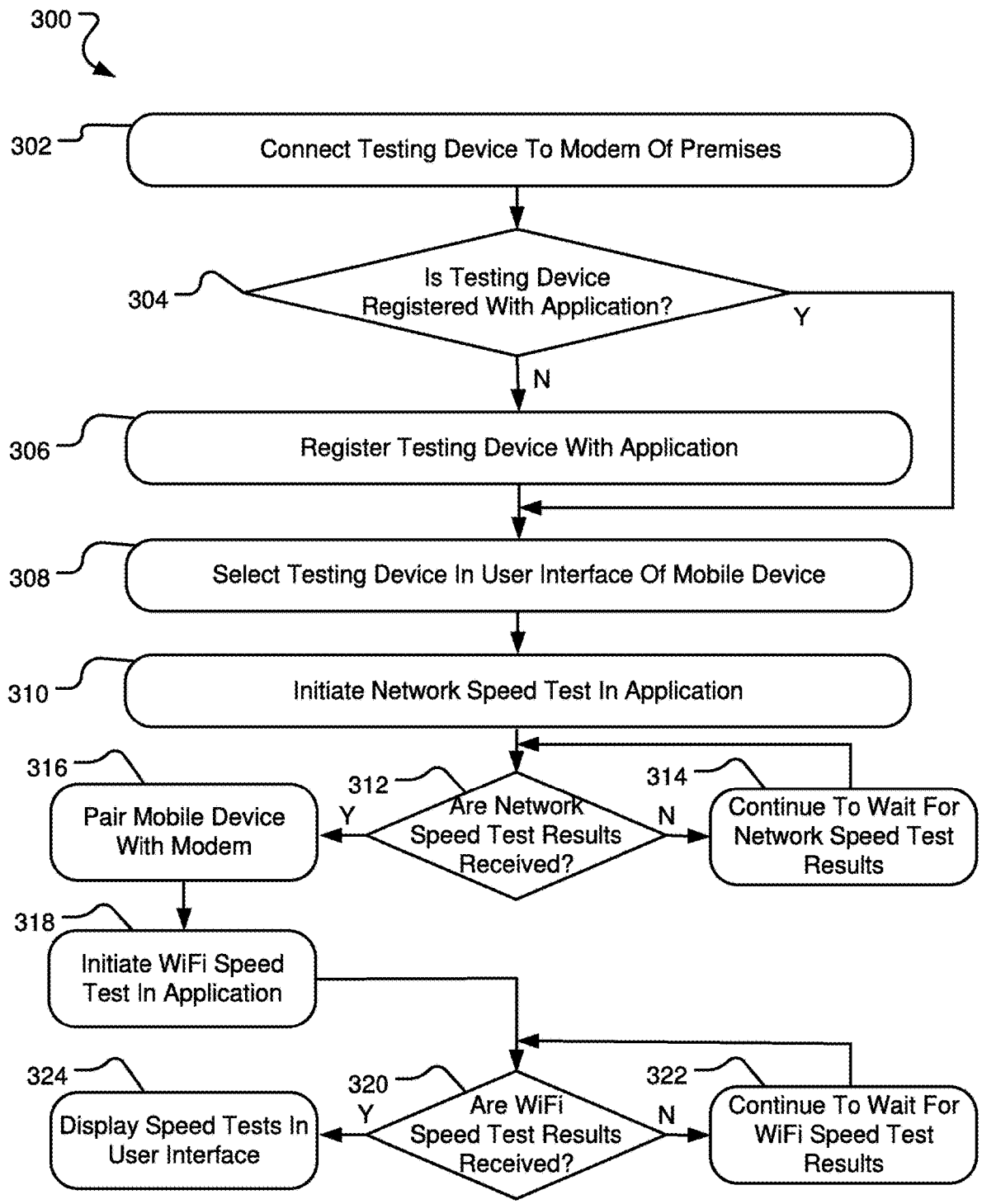
FIG. 3 is a flowchart illustrating a method for conducting various transmission speed tests associated with a customer wireless network in accordance with one embodiment.

In some instances, transmission speed tests of the network environment 200 may be conducted or controlled through the mobile device 210. In particular, FIG. 3 is a flowchart illustrating a method 300 for conducting various transmission speed tests associated with a customer wireless network. One or more of the operations of the method 300 may be performed by an application executed on the mobile device 210. To speed test components associated with the wireless network 106, a user may execute and interact with the application via the mobile device 210. In one example, a network technician may be sent to the customer premises with the mobile device 210 to conduct the transmission speed testing described herein. The results of the transmission speed testing may aid the technician in configuring, installing, or altering the WLAN at the customer premises and to store a snapshot of the performance of the WLAN for future or current use by a network administrator.

Beginning in operation 302, a testing device (illustrated as testing device 204 of FIG. 2) may be connected to or otherwise communicate with modem 202. The testing device 204, when connected to a modem 202 connected to a network 102, may be programmed or configured to communicate with a speed test controller 208 device of the network 102. In one example, the speed test controller 208 may be executed on an application server of the network 102 and may be associated with an Internet Protocol address through which communication packets may be received at the controller 208. Thus, upon connection to the modem 202, the testing device 204 may transmit one or more messages to speed test controller 208 of the network 102 at the IP address of the controller. The testing device 204 may be configured, prior to connection to the modem, with the IP address of the controller 208 or a Uniform Resource Locator (URL) associated with the speed test controller 208 such that the testing device 204 can communicate with the controller 208. The speed test controller 208 may, in turn, transmit registration information to the testing device 204 via the modem 202 connected to the network 102. The testing device 204 and the speed test controller 208 may exchange any number of communications to register the testing device 204 as connected to the network 102 via modem 202. In some instances, the testing device 204 may include an indicator, such as a connection light, which indicates to a user of the device that registration of the device 204 with the controller 208 has occurred.

In operation 304, the application determines if the testing device is registered with the application executed on the mobile device 210. In general, to conduct a transmission speed test using the testing device 204, the application may register the testing device 204 or otherwise obtain a unique identifier of the testing device. For example, each testing device 204 may be associated with a unique serial number that the testing device may use to identify itself to the network 102. In another example, the controller 208 may include a registry of testing device serial numbers and an associated unique network identifier. In some instances, the serial number associated with the testing device 204 may be printed or otherwise visible on the outside of the device. If the testing device 204 is not registered with the application, the application may register the testing device 204 in operation 306. To register the testing device 204 with the application, a user of the mobile device 210 may utilize an input device, such as a keyboard or the user interface, to provide the serial number of the testing device 204. In another example, the application may access a camera of the mobile device 210 and provide instructions to the user, via a display of the mobile device 210, to take a photo or otherwise scan the testing device 204. The application may analyze, such as through an image analysis program, to determine the serial number of the testing device 204 from the image of the device taken with the camera. In one example, the serial number information of the testing device 204 may be included in a QR code or a bar code on the outside surface of the testing device 204. The serial number or other unique identifier of the testing device 204 may then be stored in the application for use by the application in conducting or controlling transmission speed tests using the testing device 204.

Figure 4:
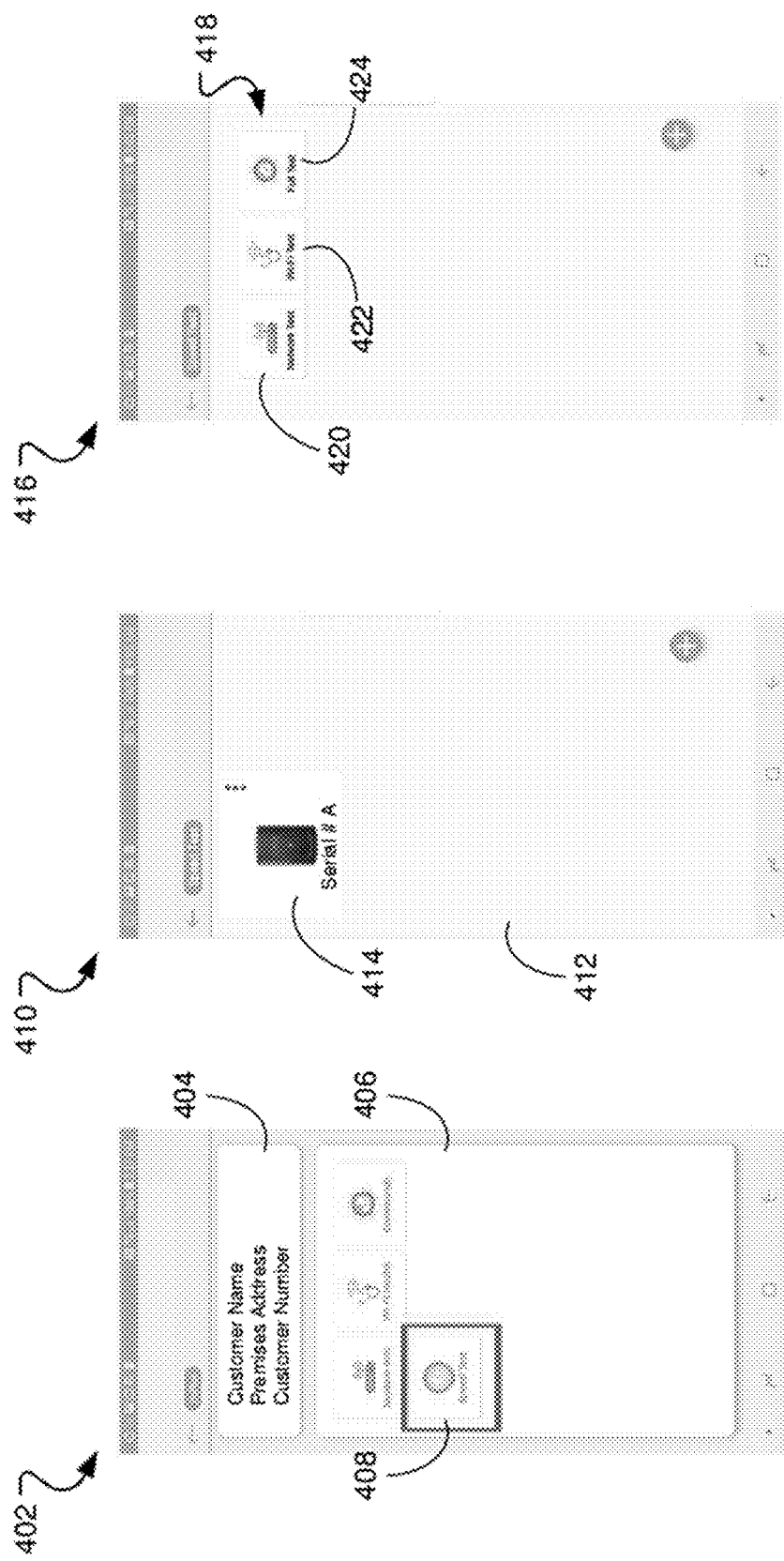
FIGS. 4A-4C illustrate example user interfaces for initiating a network speed test from an application executed on a mobile device in accordance with one embodiment.

In operation 308, the testing device 204 being used for transmission tests may be selected via a user interface of the application of the mobile device 210. For example, FIGS. 4A-4C illustrate example user interfaces for initiating a network speed test from an application executed on a mobile device 210. In particular, FIG. 4A illustrates a first user interface 402 for selecting to control one or more transmission tests associated with a customer's WLAN. As mentioned above, the user interface 402 may be displayed on the mobile device and be associated with the application. The user interface 402 generally provides information from the application to a user of the mobile device 210 and receives inputs from the user through an input device of the mobile device 210, such as a touch screen input. The user interface 402 may include a portion 404 that displays information associated with a customer of the network 102, such as a customer name, an address of the customer premises, a customer identifier or number, and the like. In some instances, the mobile device 210 may be carried by a network technician to the customer premises to conduct the one or more transmission speed tests, in addition to other network services.

Through the user interface 402, the technician may indicate a "Speed Test" button 408 in a portion 406 of the user interface 402 that may include selectable buttons for several network services. Upon selection to run a transmission test, the user interface 402 may request the user of the mobile device 210 to select a testing device 204 to be used during the speed testing. In particular, FIG. 4B illustrates a second user interface 410 for selecting or registering a testing device 204 for use in one or more transmission tests associated with a customer's WLAN. The user interface 410 may again be displayed on a display device of the mobile device 210 for interaction with a user. The user interface 410 may display an indication or representation of saved testing devices 204 associated with the mobile device 210. For example, a testing device 204 may be registered with the application executed on the mobile device 210 as mentioned above, such as through a scan of a QR code of the testing device 204 or through the entry of a serial number of the testing device 204 into the user interface. Once provided, the application may store testing device 204 information and generate an indicator of stored devices. As shown in user interface 410, the indicator 414 may include an image of the testing device 204 and the serial number or other unique identifier associated with the testing device 204. The application may store or retain information associated with more than one testing device for use by a user of the mobile device 210 for speed testing. Additional testing devices 204 may be added and stored testing devices 204 may be removed from the application through interactions with the user interface 210.

Returning to FIG. 3, the application may initiate a network speed test in operation 310. To initiate the network speed test, a user of the application may activate a button or other portion of the user interface to being the network speed test process. For examples, FIG. 4C illustrates a third user interface 416 for selecting which transmission speed test to conduct on the customer's WLAN. In one example, the user interface 416 may include one or more buttons or other activators 418 each associated with one or more transmission speed tests associated with the customer's WLAN. In the example shown, the buttons 418 include a selector for a network speed test 420, a Wi-Fi speed test 422, or a full speed test 424. More or fewer selectors may be included in the user interface 416. The Wi-Fi speed test is described in more detail below. In some instances, the full test activator 424 may initiate both a network speed test and a Wi-Fi speed test. In this example, a user of the mobile device 210 may activate or select the network speed test button 420 through an input device to the user interface 416 to begin the network speed test.

Returning to FIG. 2, additional portions of the network speed test procedure are now described. As described above, the testing device 204 may register with the speed test controller 208 such that the controller receives the testing device 204 serial number and the modem 202 through which the testing device 204 communicates with the network 102. The mobile device 210 may, in response to a user selecting to initiate a network speed test through the user interface 416 described above, transmit an instruction or command to the speed test controller 208 to begin the network speed test. In response, the controller may transmit one or more instructions to the testing device 204 (via modem 202) to connect to a speed test server 206 of the network 102. In general, one or more application servers of the network 102 may be configured to operate as a speed test server 206. In general, the speed test server 206 conducts network speed tests with a requesting device, such as testing device 204. Multiple speed test servers 102 may be included in the network 102 to conduct network speed tests with devices in various geographic locations. In one instance, connection to a speed test server 102 may occur through Anycast routing such that the test server 102 that is geographical closest to the requesting device is used. In response to the instructions from the speed test controller 208, the test device 204 may connect to the speed test server 206 via modem 202. During connection, the speed test server 206 may receive an IP address of the modem 202 and/or the testing device 204 to transmit test communications to the testing device 204. Similarly, the speed test server 206 may provide an associated IP address to the testing device 204 such that the testing device 204 may transmit test communications to the speed test server 206.

Once the testing device 204 and the speed test server 206 are in communication, the speed test controller 208 may conduct a network speed test. In general, the network speed test measures an elapsed time to transmit a packet downstream (server 206 to testing device 204) and upstream (testing device 204 to server 206). The downstream and upstream tests may occur separately to obtain the separate transmission speed measurements. In some instances, several measurements may be taken to transmit communications between the devices and the returned results of the speed test may include an average or any other calculation based on the multiple speed test results. Further, in some instances, the speed test controller 208 may instruct the server 206 and/or the testing device 204 to transmit communications and obtain or measure the elapsed time to transmit communications between the devices. In other instances, the speed test controller 208 may monitor the activities of both speed test server 206 and testing device 204 to determine the elapsed time to transmit messages between the devices. Regardless of which devices conducts the network speed testing between the speed test server 206 and the testing device 204 or determines the elapsed time to transmit the packets between the devices, the speed test controller 208 may obtain the results of the test. In general, the test results are expressed in bits per second (bps) rate that provides the number of bits that may be transmitted between the devices every second. In some instances, the transmission speed rate may be between 900-1000 Mbps, although the bps of the downstream and/or upstream transmissions may vary based on network configurations, device configurations, transmission errors, overloading of transmission devices or lines, and the like. In general, however, the upstream and downstream transmission rates provide an indication of the quality of Internet service provided to the modem 202 of the customer WLAN.

The speed test controller 208 may provide the network test results to a test records management device 212. The test records management device 212 may be a server or other device of network 102 or may be separate from (but in communication with) the network 102. In general, the test records management device 212 may manage test records from one or more transmission speed tests conducted on network 102, such as the network speed test described above. The test records management device 212 may associate the test results received from speed test controller 208 with an indication of the premises or customer network 106 to which the test was conducted and store the results in a speed test records database 214. In one instance, the test records management device 212 may receive an indication of the premises or customer network 106 from the mobile device 210 or the speed test controller 208 when the network speed test is initiated such that either device may be in communication with test records management device 212. In addition, the test records management device 212 may provide the network speed test results for the premises or customer WLAN 106 to the application executed on the mobile device 210. The network speed test results may be displayed on the user interface of the application of the mobile device 210, as explained in more detail below.

Returning to the method 300 of FIG. 3, the application may determine, in operation 312, if the network speed test results have been received from the test records management device 212 at the mobile device 210. If not, the application may wait, in operation 314, for the network speed test results to be provided by the test records management device 212. When the network speed test results are provided, the application may conduct a Wi-Fi speed test for the customer WLAN. In operation 316, the mobile device 210 may be paired with the modem 202 of the WLAN of the premises. To pair with the modem 202, the mobile device 210 may connect to a wireless network signal transmitted by the modem 202, such as a Wi-Fi network signal identified through a Service Set Identifier (SSID) identifier. The mobile device 210 may transmit a request to connect to the wireless network of the modem 202 (which may include a password or other security information) and receive an acknowledgement of connection to the network. Once connected, the application of the mobile device 210 may transmit messages to the network 102 via the modem 202.

Figure 5:
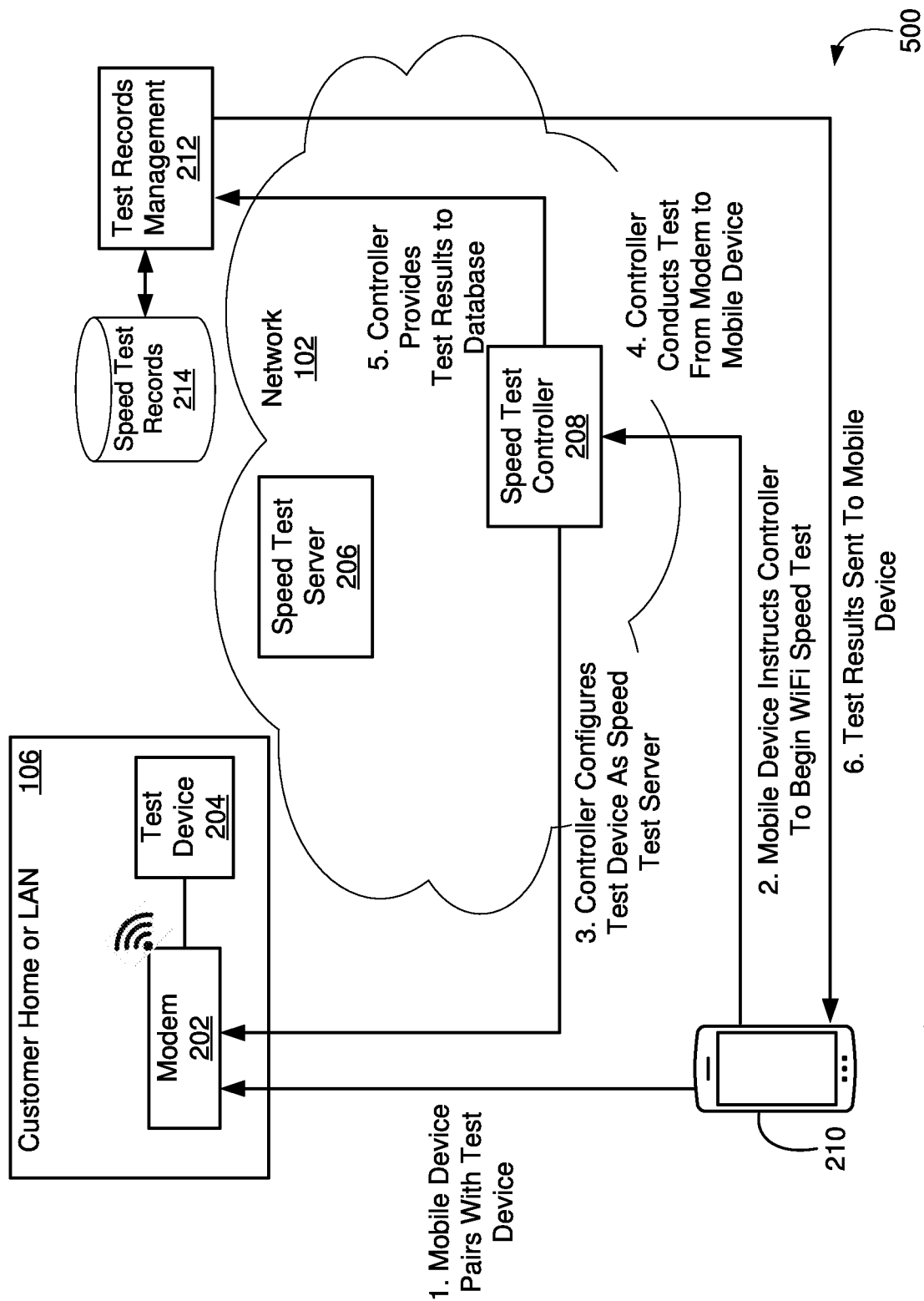
FIG. 5 is a schematic diagram illustrating a network environment and method for conducting a Wi-Fi speed test between a modem of a customer network and a wireless device in communication with the modem in accordance with one embodiment.

Once paired with the modem 202, the application of the mobile device 210 may initiate a Wi-Fi speed in operation 318. Similar to the network speed test, initiation of the Wi-Fi speed test may occur through selection of a Wi-Fi speed test button 422 on the user interface 416 associated with the application. In another instance, the Wi-Fi speed test may conducted by the application by activating the full test button 424 of the user interface 416. Regardless of how the Wi-Fi speed test is initiated, FIG. 5 is a schematic diagram illustrating a network environment 500 and method for conducting a Wi-Fi speed test between a modem 202 of a customer network 106 and a wireless device 210 in communication with the modem 202. The Wi-Fi speed test provides an indication of the transmission speed over the wireless network or WLAN of the customer network 106 to one or more locations within the customer premises. The components of the network 500 are similar or the same as that discussed above with relation to FIG. 2 such that the same components may be used to conduct both the network speed test and the Wi-Fi speed test.

As illustrated in the network environment 500, the mobile device 210 may pair with the modem 202 in a manner as described above. Once paired, the application of the mobile device 210 may transmit one or more instructions or commands to speed test controller 208 to initiate the Wi-Fi speed test. In response, the speed test controller 208 may transmit one or more instructions or commands to the testing device 204 (via modem 202) to transition the testing device 204 from a client of a transmission speed test to operate as a speed test server, similar to speed test server 206. In other words, the testing device 204 is configured to transmit and receive test communications to a client program or application executed on the mobile device 210. The speed test controller 208 transmits the configuration instructions based on the registration information received from the testing device 204 as described above.

Acting as a speed test server, the testing device 204 may transmit test communications to the application of the mobile device 210. In particular, the application may include client instructions or programs that configure the application to receive test packets, make measurements on transmission speeds of the test packets, and/or transmit test packets to the paired server, i.e. the testing device 204. Similar to the network speed test discussed above, the Wi-Fi speed test may include several transmissions between testing device 204 and mobile device 210 via modem 202 from which an average or other calculation of approximate transmission speed may be obtained. In this case, however, the transmissions may be made over the wireless network generated by the modem 202 rather than over a wired connection to the network 102. Also similar to above, the speed test measurements may be determined by the testing device 204, the application executing the client program of the mobile device 210, and/or the speed test controller 208. Regardless of how the measurements are made, the Wi-Fi speed test results may be obtained by or provided to speed test controller 208. The speed test controller 208 may provide the Wi-Fi test results to a test records management device 212 for storage in the speed test records 214, also associated with the indication of the premises or customer network 106 to which the test was conducted. In addition, the test records management device 212 may provide the Wi-Fi speed test results for the premises or customer WLAN 106 to the application executed on the mobile device 210.

Returning to the method 300 of FIG. 3, the application may determine, in operation 320, if the Wi-Fi speed test results have been received from the test records management device 212 at the mobile device 210. If not, the application may wait, in operation 322, for the Wi-Fi speed test results to be provided by the test records management device 212. When the Wi-Fi speed test results are provided, the application may display the transmission speed test results in the user interface of the application in operation 324. In some instances, the network speed test results may be displayed upon receipt such that the results of the Wi-Fi speed test may not be needed before being displayed. Examples of user interfaces including the results of the transmission speed tests are provided in FIGS. 6A-6B. In particular, FIG. 6A illustrates a user interface 602 displaying results from a network speed test conducted in a similar manner as described above. One or more of the illustrated portions of the user interface 602 may be included, including additional information than shown. In the particular instance shown, the user interface 602 may display the serial number of the testing device 204 used to conduct the network speed test and an IP address associated with modem 202 of the WLAN. This information may be provided for verification by a user of the mobile device 210. In addition, the calculated or determined download transmission rate 608 may be illustrated, such as in Mbps. The calculated or determined upload transmission rate 610 may also be illustrated, similarly in Mbps. In some instances, the results may be displayed in color based on a comparison of the calculated speed to one or more threshold values. For example, transmission speed results that fall below the threshold value may be displayed in a red color, while transmission speed results that exceed the threshold value may be displayed in green. In general, any number of colors may be used to display the results. In one particular instance, the threshold value for comparison may be 90% of the agreed upon network transmission rate in a corresponding SLA between the customer and a network manager. The user interface 602 may also include a visual representation 612 of the calculated transmission speeds for ease of understanding. The visual representation 612 may include an illustration of a graph, a meter, or a similar illustration of a transmission speed. Results of the Wi-Fi speed test may include similar illustrations or representations of the results in the user interface. Additional or alternative representations of results of the speed tests are discussed in more detail below.

Figure 7A:
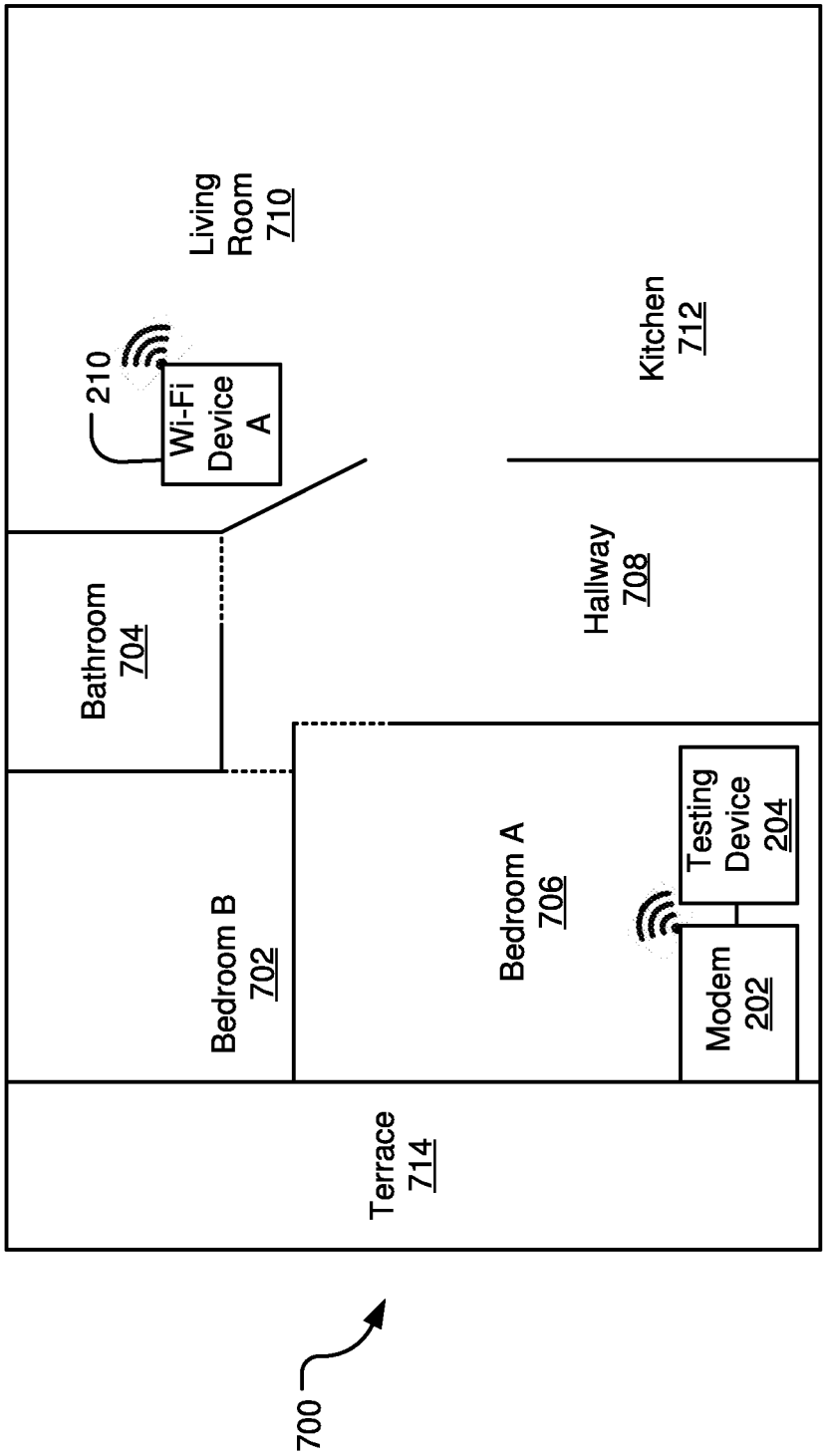
FIG. 7A is a schematic diagram illustrating a floor plan of a home network to conduct a first Wi-Fi speed test in accordance with one embodiment.

As mentioned above, a user of the mobile device 210 may select to conduct the Wi-Fi speed test through activation button 422 in the user interface associated with the application. Activation of the may cause the application to display the user interface 614 of FIG. 6B. In particular, FIG. 6B illustrates an example of a user interface 614 for initiating a Wi-Fi speed test of a wireless network from an application executed on a mobile device 210. As discussed, the Wi-Fi speed test may be performed following a pairing of the mobile device 210 with the modem 202 of the premises. Further, in some instances, multiple Wi-Fi speed tests may be performed in the customer premises to determine a wireless signal coverage for various locations within the premises. For example, FIG. 7A is a schematic diagram illustrating a floor plan 700 of a customer premises in which a first Wi-Fi speed test may be performed. To conduct the Wi-Fi speed test, a user of the mobile device 210 may be located within the premises (or otherwise within range of the wireless network signal emitted by the modem 202) at a first location. As shown in FIG. 7A, a first Wi-Fi speed test may be initiated and conducted with the mobile device 210 (acting as the client in the speed test) located in the living room 710 of the customer's premises. The testing device 204 (connected to the modem 202) may be located in a different location of the premises (such as bedroom A 706) and the transmission speed between the modem 202 and the mobile device 210 may be measured or determined.

Returning to the user interface 614 of FIG. 6B, the results of the first Wi-Fi speed test may be displayed, including an indication of an upstream transmission speed 616 (expressed in bits per second or any other measurement rate), a downstream transmission speed 618, a visual representation of either upstream or downstream speed, an estimated signal strength 622 determined at the mobile device 210, and a network information portion 624 providing various information about the WLAN over which the test is conducted, such as a wireless signal frequency, a channel used, an encryption method used, and one or more IP addresses associated with the devices under test. More or less network information may be included in the network information portion 624 of the user interface 614. The displayed results may also be stored in a speed test records database 214 as discussed above.

In addition to providing the Wi-Fi speed test results, the user interface 614 may provide relative location information for each Wi-Fi speed test conducted. For example, prior to or after initiating the Wi-Fi speed test, a user of the mobile device 210 may use the interface 614 to select general locations within the premises 700 of the mobile device 210 and/or the modem 202 to provide context to the speed test results. As such, the user interface 614 may include a list 626 of potential locations for the mobile device 210 within the customer premises 700 and a list 628 of potential locations for the modem 202 within the customer premises 700. The results obtained from the Wi-Fi speed test may be correlated or associated with the general location information for the mobile device 210 and/or the modem location 202. One or more Wi-Fi speed tests may be initiated through the user interface 614 via the "Go" button 630 or other test initiation activator.

Figure 7B:
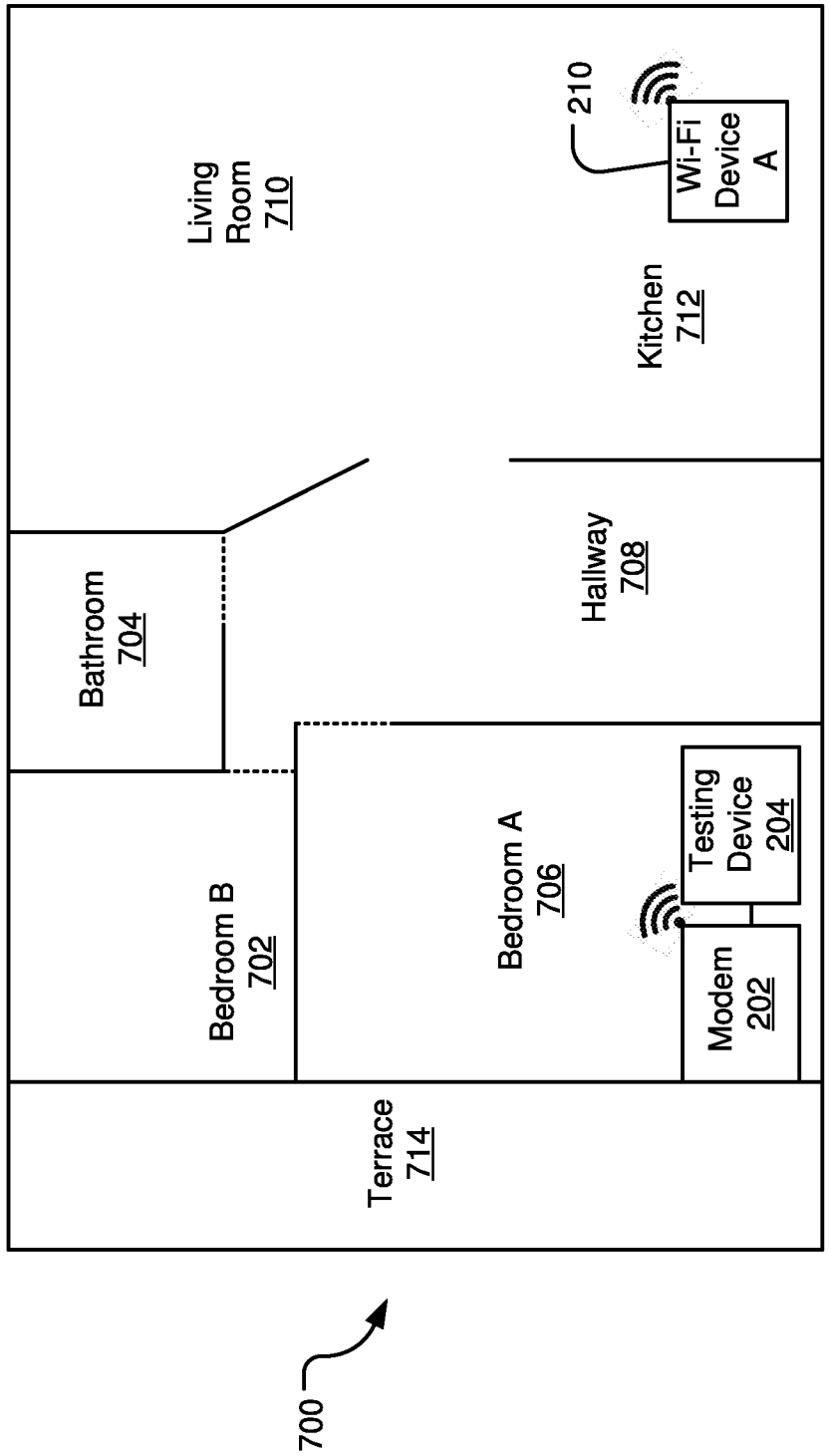
FIG. 7B is a schematic diagram illustrating a floor plan of a home network to conduct a second Wi-Fi speed test in accordance with one embodiment.

The location information of the mobile device 210 and/or the modem 202 may aid the user of the application to discern the signal strength in various locations within the premises 700. For example, for the Wi-Fi speed test illustrated in FIG. 7A, the application may associate a modem location of "Master Bedroom" from the provided list 628 and a "Living Room" location for mobile device 210 for the results obtained during the test. The general location of the devices during the test may be stored with the results in the test records 224 and displayed in the user interface 614. Following the first test, the mobile device 210 may be moved to a second location to determine the Wi-Fi speed with the mobile device located in the second location. For example, FIG. 7B is a schematic diagram illustrating a floor plan 700 of a home network to conduct a second Wi-Fi speed test. In this example, the mobile device 210 is now located in the kitchen 712 of the premises 700 with the modem 202 still located in bedroom A 202. A second Wi-Fi speed test may be initiated (potentially through the user interface 614) with the mobile device 210 located in the kitchen 712, providing a second set of Wi-Fi test results. The results of the second test may be tagged or otherwise associated with the relative location of the devices within the premises 700. Through the location tags, various Wi-Fi speed tests may be conducted and the location within the premises 700 of the devices may be noted to compare the results and gain a better understanding of the signal strength within the wireless network range. In general, the user interface 614 may include any number of location tags selectable by a user of the application to provide an indication of the location of the devices of the WLAN during a speed test. The user interface 614 illustrated in FIG. 6B is merely an example of one type of interface as other options may be possible.

Figure 8B:
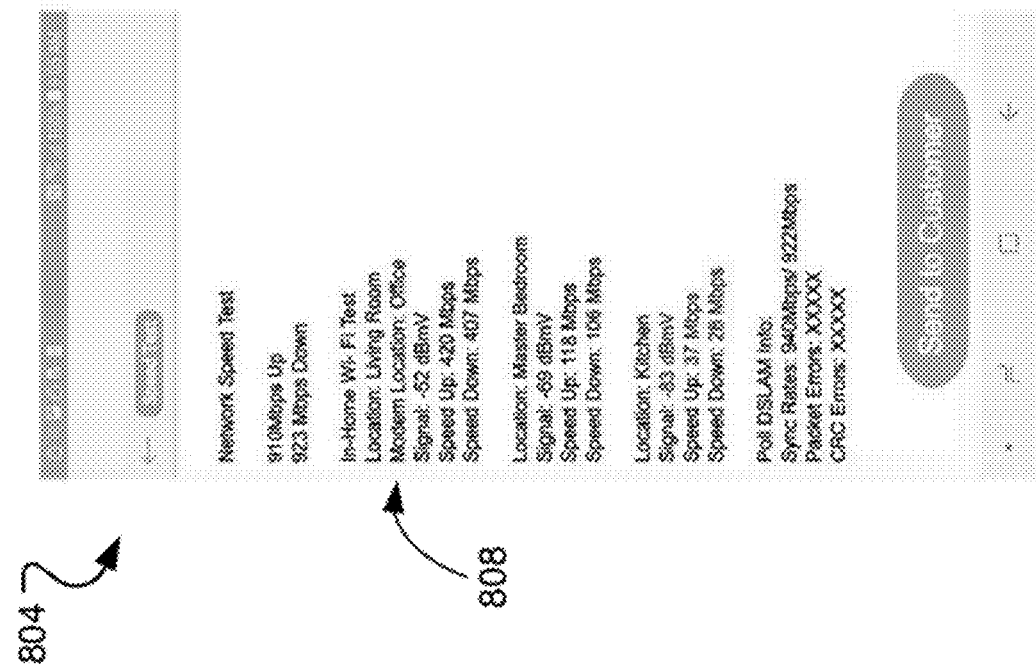
FIGS. 8A-8B illustrate example user interfaces for displaying a summary of one or more results of transmission speed tests of a wireless network in accordance with one embodiment.
Figure 8A:
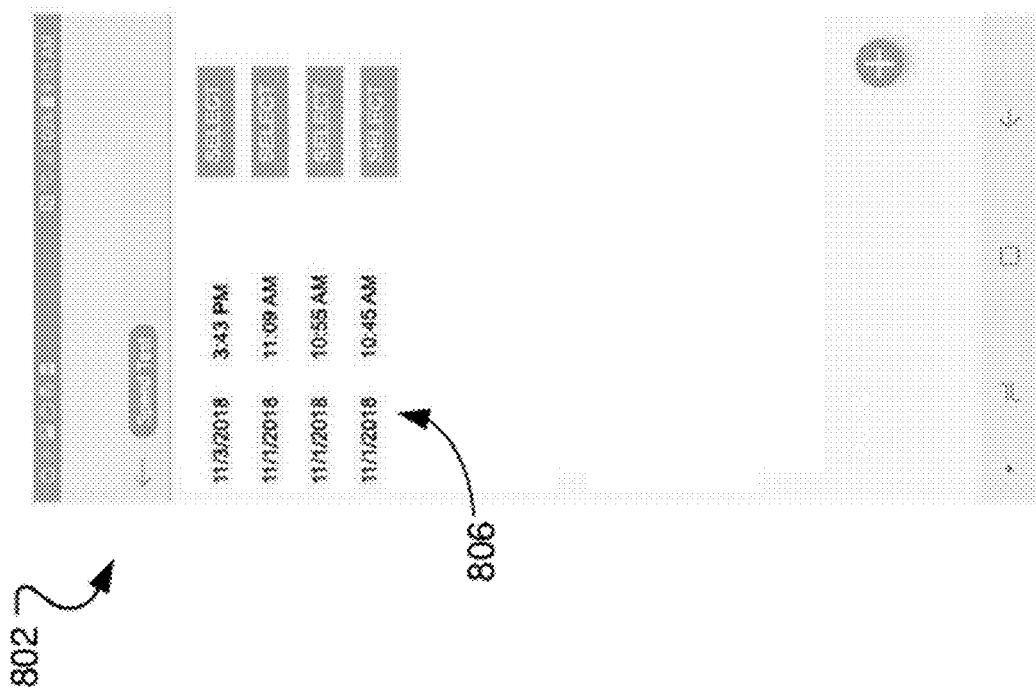

As mentioned, the results from the one or more transmission speed tests may be transmitted or otherwise provided to the test records management device 212 for storage in the speed test records database 214. The various transmission speed test results may be associated with the customer premises or account for use in management of the customer network 106. For example, a network technician or the customer themselves may receive and analyze the various transmission speed test results to configure or alter the customer network 106 based on the performance history of the network. FIGS. 8A-8B illustrate example user interfaces 802-804 for displaying a summary of one or more results of transmission speed tests of a wireless network. The user interfaces 802-804 may be displayed on the mobile device 210 for use by the user of the application.

The user interface 802 of FIG. 8A may include a list 806 of one or more previous transmission speed tests associated with the customer premises 700. The results of a previously conducted speed test may be selected by a user of the application. Upon selection, the application may display the results associated with the selected transmission speed test. The user interface 804 of FIG. 8B illustrates one example of displaying speed test results 808 associated with a customer premises 700. The results may be presented, in some instances, in a similar manner as discussed above that includes a visual representation of the test results. By analyzing the various speed test results, a user of the application may review the history of the customer network performance.

Figure 9:
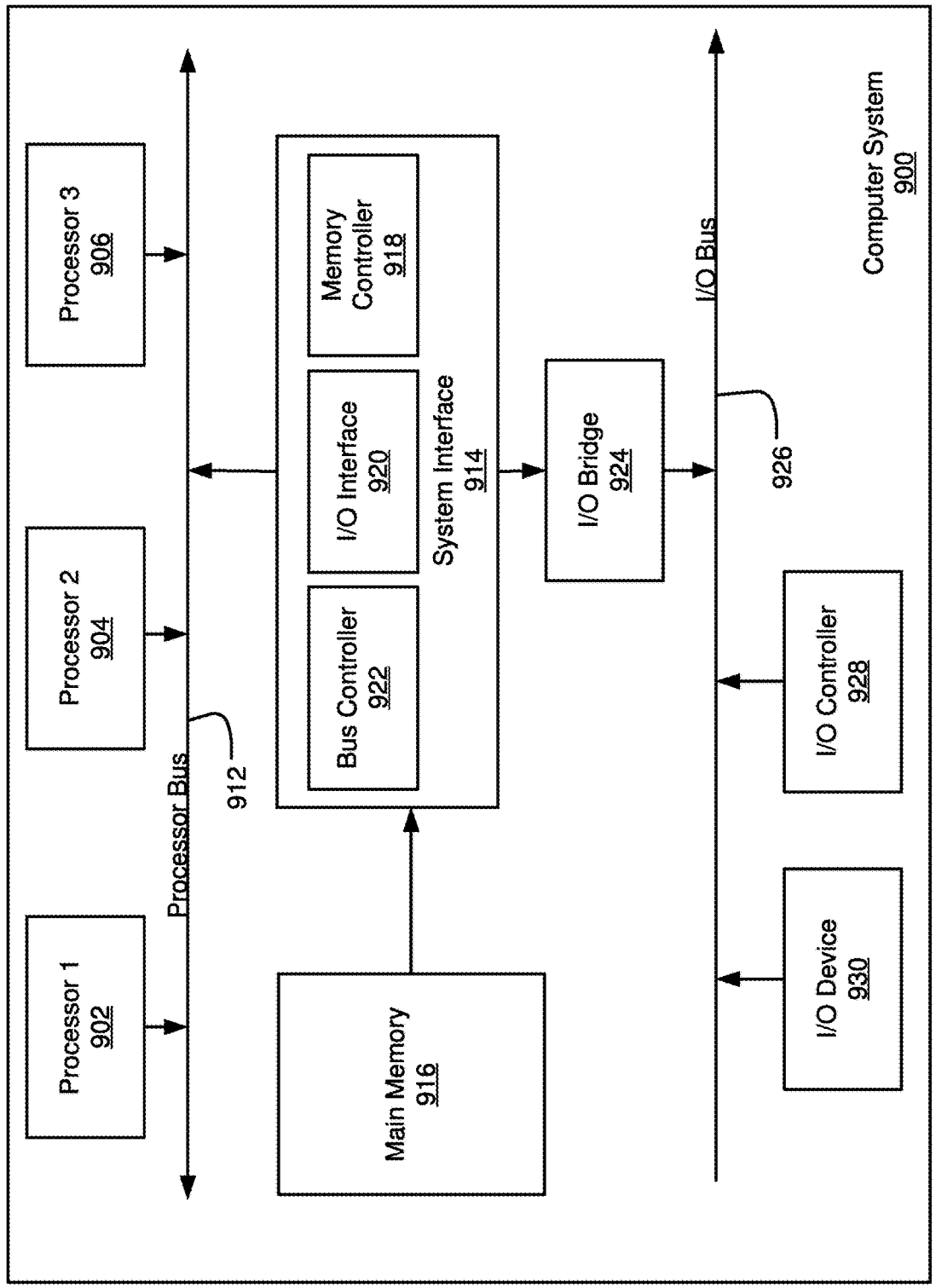
FIG. 9 is a diagram illustrating an example of a computing system which may be used in implementing embodiments of the present disclosure.

FIG. 9 is a block diagram illustrating an example of a computing device or computer system 900 which may be used in implementing the embodiments of the components of the network disclosed above. For example, the computing system 900 of FIG. 9 may be the computing device on which the application discussed above is executed. The computer system (system) includes one or more processors 902-906. Processors 902-906 may include one or more internal levels of cache (not shown) and a bus controller or bus interface unit to direct interaction with the processor bus 912. Processor bus 912, also known as the host bus or the front side bus, may be used to couple the processors 902-906 with the system interface 914. System interface 914 may be connected to the processor bus 912 to interface other components of the system 900 with the processor bus 912. For example, system interface 914 may include a memory controller 914 for interfacing a main memory 916 with the processor bus 912. The main memory 916 typically includes one or more memory cards and a control circuit (not shown). System interface 914 may also include an input/output (I/O) interface 920 to interface one or more I/O bridges or I/O devices with the processor bus 912. One or more I/O controllers and/or I/O devices may be connected with the I/O bus 926, such as I/O controller 928 and I/O device 930, as illustrated.

I/O device 930 may also include an input device (not shown), such as an alphanumeric input device, including alphanumeric and other keys for communicating information and/or command selections to the processors 902-906. Another type of user input device includes cursor control, such as a mouse, a trackball, or cursor direction keys for communicating direction information and command selections to the processors 902-906 and for controlling cursor movement on the display device.

System 900 may include a dynamic storage device, referred to as main memory 916, or a random access memory (RAM) or other computer-readable devices coupled to the processor bus 912 for storing information and instructions to be executed by the processors 902-906. Main memory 916 also may be used for storing temporary variables or other intermediate information during execution of instructions by the processors 902-906. System 900 may include a read only memory (ROM) and/or other static storage device coupled to the processor bus 912 for storing static information and instructions for the processors 902-906. The system set forth in FIG. 9 is but one possible example of a computer system that may employ or be configured in accordance with aspects of the present disclosure.

According to one embodiment, the above techniques may be performed by computer system 900 in response to processor 904 executing one or more sequences of one or more instructions contained in main memory 916. These instructions may be read into main memory 916 from another machine-readable medium, such as a storage device. Execution of the sequences of instructions contained in main memory 916 may cause processors 902-906 to perform the process steps described herein. In alternative embodiments, circuitry may be used in place of or in combination with the software instructions. Thus, embodiments of the present disclosure may include both hardware and software components.

A machine readable medium includes any mechanism for storing or transmitting information in a form (e.g., software, processing application) readable by a machine (e.g., a computer). Such media may take the form of, but is not limited to, non-volatile media and volatile media and may include removable data storage media, non-removable data storage media, and/or external storage devices made available via a wired or wireless network architecture with such computer program products, including one or more database management products, web server products, application server products, and/or other additional software components. Examples of removable data storage media include Compact Disc Read-Only Memory (CD-ROM), Digital Versatile Disc Read-Only Memory (DVD-ROM), magneto-optical disks, flash drives, and the like. Examples of non-removable data storage media include internal magnetic hard disks, SSDs, and the like. The one or more memory devices 606 may include volatile memory (e.g., dynamic random access memory (DRAM), static random access memory (SRAM), etc.) and/or non-volatile memory (e.g., read-only memory (ROM), flash memory, etc.).

Computer program products containing mechanisms to effectuate the systems and methods in accordance with the presently described technology may reside in main memory 916, which may be referred to as machine-readable media. It will be appreciated that machine-readable media may include any tangible non-transitory medium that is capable of storing or encoding instructions to perform any one or more of the operations of the present disclosure for execution by a machine or that is capable of storing or encoding data structures and/or modules utilized by or associated with such instructions. Machine-readable media may include a single medium or multiple media (e.g., a centralized or distributed database, and/or associated caches and servers) that store the one or more executable instructions or data structures.

Embodiments of the present disclosure include various steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations together with all equivalents thereof.

What is claimed is:

1. A system for testing a network performance, the system comprising:
   a testing controller controlling a testing device to communicate with a server of a telecommunications network and measure an associated transmission speed of network test communications received at the testing device during a transmission speed test of the testing device and from the server via a wireless broadcasting device, the transmission speed test initiated in response to test initiation commands transmitted to the testing controller via a mobile device, wherein the mobile device receives the measure of the associated network transmission speed of the test communications for display on a display device associated with the mobile device, wherein
   the testing controller, in response to a wireless speed test initiation command from the mobile device, configures the testing device to transmit first wireless test communications to the mobile device via the wireless broadcasting device where the mobile device is at a first geographic location and to transmit second wireless test communications to the mobile device via the wireless broadcasting device where the mobile device is at a second geographic location, and the mobile device receives a measure of an associated transmission speed of wireless test communications based on a transmission speed of the first wireless test communications and a transmission speed for the second wireless test communications for display on the display device associated with the mobile device.

2. The system of claim 1, wherein the mobile device further executes a wireless test client application to receive the wireless test communications the associated transmission speed of wireless test communications.

3. The system of claim 2, wherein the mobile device receives a first location indication of a first location within a premises associated with the testing device and a second location indication of a second location within the premises associated with the mobile device.

4. The system of claim 3, wherein the determined transmission speed of the wireless test communications is associated with the first location indication and the second location indication.

5. The system of claim 1, further comprising a network test database storing the determined transmission speed of the wireless test communications and the associated network transmission speed of the test communications with an identification of a customer network associated with the transmission speeds.

6. The system of claim 1, wherein the mobile device receives an identifier of the testing device via an input device of the mobile device and stores the identifier of the testing device.

7. A wireless network device comprising:
one or more processors;
a wireless transmitter/receiver in communication with the one or more processors; and
a memory comprising instructions that, when executed by the one or more processors, perform the operations of:
obtaining a network transmission speed measurement of one or more network test communications between a testing device and a testing server of a network, wherein the testing device transmits, to the testing server, the one or more network test communications via a wireless broadcasting device in communication with the testing server of the network;
obtaining a wireless transmission speed measurement of wireless test communications transmitted between the testing device and a wireless test client application executed on a mobile device, wherein the testing device transmits, to the mobile device, first wireless test communications via the wireless broadcasting device where the mobile device is at a first geographic location and transmits, to the mobile device, second wireless test communications via the wireless broadcasting device where the mobile device is at a second geographic location, the wireless transmission speed measurement based on a first transmission speed of the first wireless test communications and a second transmission speed of the second wireless test communications; and
displaying, on a display device and via a user interface, the network transmission speed measurement of the one or more network test communications and the wireless transmission speed measurement of the one or more wireless test communications.

8. The wireless network device of claim 7, wherein the instructions further perform the operation of:
registering the testing device by receiving, via the user interface, a unique identifier associated with the testing device; and
obtaining an identifier of the testing device by comparing the received unique identifier to a database of stored unique identifiers and corresponding testing device identifiers.

9. The wireless network device of claim 7, wherein the instructions further perform the operation of:
connecting, via the wireless transmitter/receiver, to a wireless network signal broadcast transmitted by the wireless broadcasting device; and
executing a wireless test client application to communicate with the testing device to receive the one or more wireless test communications.

10. The wireless network device of claim 7, wherein the instructions further perform the operation of:
transmitting one or more network test initiation commands to a testing controller of the network, the one or more network test initiation commands initiating transmission of the one or more network test communications.

11. The wireless network device of claim 7, wherein the instructions further perform the operation of:
transmitting one or more wireless test initiation commands to a testing controller of the network, the one or more wireless test initiation commands initiating transmission of the one or more wireless test communications.

12. The wireless network device of claim 7, wherein obtaining the network transmission speed measurement and the wireless transmission speed measurement comprises accessing a network test database storing the network transmission speed measurement and the wireless transmission speed measurement with an identification of a customer network associated with the transmission speed measurements.

13. The wireless network device of claim 7, wherein the instructions further perform the operation of:
receiving, via the user interface, a first location indicator of a first location within a premises of the wireless broadcasting device and a second location indicator of a second location within the premises of the mobile device.

14. The wireless network device of claim 7, wherein displaying the wireless transmission speed measurement of the one or more wireless test communications comprises associating the wireless transmission speed measurement of the one or more wireless test communications with the first location indicator of the wireless broadcasting device and the second location indicator of the mobile device.

15. The wireless network device of claim 7, wherein the instructions further perform the operation of:
accessing a network test database storing one or more previous network transmission speed measurements and one or more previous wireless transmission speed measurements associated with an identification of a customer network; and
displaying, on the display device and via the user interface, the previous one or more network transmission speed measurements and the one or more previous wireless transmission speed measurements associated with an identification of a customer network.

16. A method for network testing, the method comprising:
registering a testing device associated in communication with a wireless broadcasting device;
initiating a network speed test to determine a transmission speed of one or more network test communications between the testing device and a testing server of a network, wherein the testing device transmits the one or more network test communications via the wireless broadcasting device;
connecting, via the wireless transmitter/receiver, to a wireless network signal broadcast by the wireless broadcasting device;
executing a wireless test client application to communicate with the testing device to receive one or more wireless test communications; and
initiating a wireless speed test to determine a transmission speed of wireless test communications between the testing device and a wireless test client application executed on a mobile device, wherein the testing device transmits first wireless test communications via the wireless broadcasting device where the mobile device is at a first geographic location and transmits, to the mobile device, second wireless test communications via the wireless broadcasting device where the mobile device is at a second geographic location, the wireless transmission speed measurement based on a first transmission speed of the first wireless test communications and a second transmission speed of the second wireless test communications.

17. The method of claim 16 further comprising:
displaying, on a display device and via a user interface, the determined transmission speed of the one or more network test communications and the determined transmission speed of the one or more wireless test communications.

18. The method of claim 16, wherein initiating the network speed test comprises transmitting one or more network test initiation commands to a testing controller of the network, the one or more network test initiation commands initiating transmission of the one or more network test communications.

* * * * *